(12) United States Patent
Wu et al.

(10) Patent No.: US 12,499,562 B2
(45) Date of Patent: Dec. 16, 2025

(54) METHOD AND SYSTEM FOR GENERATING A THREE DIMENSIONAL IMAGE

(71) Applicant: QISDA CORPORATION, Taoyuan (TW)

(72) Inventors: Chuang-Wei Wu, Taoyuan (TW); Yen-Tsun Lin, Taichung (TW)

(73) Assignee: Qisda Corporation, Taoyuan (TW)

( * ) Notice: Subject to any disclaimer, the term of this patent is extended or adjusted under 35 U.S.C. 154(b) by 318 days.

(21) Appl. No.: 18/097,477

(22) Filed: Jan. 16, 2023

(65) Prior Publication Data

US 2023/0298187 A1    Sep. 21, 2023

(30) Foreign Application Priority Data

Mar. 15, 2022  (CN) .......................... 202210254720.5

(51) Int. Cl.
```
G06T 7/32     (2017.01)
G06T 7/33     (2017.01)
G06T 7/73     (2017.01)
G06T 17/00    (2006.01)
```
(52) U.S. Cl.
CPC ................ *G06T 7/32* (2017.01); *G06T 7/344* (2017.01); *G06T 7/75* (2017.01); *G06T 17/00* (2013.01); *G06T 2207/10028* (2013.01); *G06T 2207/20221* (2013.01); *G06T 2207/30036* (2013.01); *G06T 2210/41* (2013.01); *G06T 2210/56* (2013.01)

(58) Field of Classification Search
CPC .. G06T 7/32; G06T 7/344; G06T 7/75; G06T 17/00; G06T 2207/10028; G06T 2207/20221; G06T 2207/30036; G06T 2210/41; G06T 2210/56; G06T 7/38; G06T 3/4038; G06T 17/20; G06T 2200/04; G06T 2200/08; G06T 2200/32
See application file for complete search history.

(56) References Cited

U.S. PATENT DOCUMENTS

| | | | | |
|---|---|---|---|---|
| 2016/0094808 A1* | 3/2016 | Cerri | ........................ | B60R 1/27 348/36 |
| 2021/0323572 A1* | 10/2021 | He | ............................. | G06T 3/14 |
| 2022/0260375 A1* | 8/2022 | Worman | .................. | H04W 4/38 |

FOREIGN PATENT DOCUMENTS

| | | | | |
|---|---|---|---|---|
| CN | 109523581 A | * | 3/2019 | ............... G06T 7/32 |
| WO | WO-2022077296 A1 | * | 4/2022 | |
| WO | WO-2022132934 A1 | * | 6/2022 | ............. G01S 17/89 |

* cited by examiner

*Primary Examiner* — Daniel F Hajnik
*Assistant Examiner* — Adeel Bashir (57) ABSTRACT

A three dimensional image generation method can include capturing a plurality of images of an object, generating a plurality of point clouds corresponding to a first sequence and a plurality pieces of first pose information according to the plurality of images, generating a second sequence according to a plurality of correlations among the plurality of images, performing a plurality of registration operations on the plurality of point clouds in the second sequence to adjust the plurality pieces of first pose information to generate a plurality pieces of second pose information, and combining the plurality of point clouds according to the plurality pieces of second pose information to generate a three dimensional image of the object.

12 Claims, 8 Drawing Sheets

METHOD AND SYSTEM FOR GENERATING A THREE DIMENSIONAL IMAGE

BACKGROUND OF THE INVENTION

1. Field of the Invention

The disclosure is related to a method and a system for generating a three dimensional image, and more particularly, a method and a system for generating a three dimensional image by adjusting pose information according to correlations among a plurality of point clouds and accordingly combining the plurality of point clouds.

2. Description of the Prior Art

With the development of technology, more and more professionals begin to use optical auxiliary devices to ease and improve the accuracy of related operations. For example, in the field of dentistry, intraoral scanners can assist dentists in detecting the oral cavity. Intraoral scanners can capture intraoral images and convert the images into digital data to assist professionals such as dentists and denture technicians for diagnosis, treatment and denture fabrication.

When an intraoral scanner is in use to obtain images of teeth, due to the limited space in the oral cavity, the user must continuously move the intraoral scanner to obtain multiple images. The multiple images can be combined to generate a more complete three dimensional (3D) image.

In practice, it has been observed that the generated three dimensional images are often deformed, resulting in poor image quality. According to related analysis, the poor quality of the three dimensional images is often caused by the long moving distance of the scanner. As a result, errors are accumulated after combining multiple pieces of collected data, decreasing the quality of the generated three dimensional images. A solution is still in need to improve the quality of the generated three dimensional images.

SUMMARY OF THE INVENTION

An embodiment provides a three dimensional image generation method including capturing a plurality of images of an object, generating a plurality of point clouds corresponding to a first sequence and a plurality pieces of first pose information according to the plurality of images, generating a second sequence according to a plurality of correlations among the plurality of images, performing a plurality of registration operations on the plurality of point clouds in the second sequence to adjust the plurality pieces of first pose information to generate a plurality pieces of second pose information, and combining the plurality of point clouds according to the plurality pieces of second pose information to generate a three dimensional image of the object.

Another embodiment provides a three dimensional image generation system including a detector, a processor and a display. The detector is used to capture a plurality of images of an object. The processor is used to generate a plurality of point clouds corresponding to a first sequence and a plurality pieces of first pose information according to the plurality of images, generate a second sequence according to a plurality of correlations among the plurality of images, perform a plurality of registration operations on the plurality of point clouds in the second sequence to adjust the plurality pieces of first pose information to generate a plurality pieces of second pose information, and combine the plurality of point clouds according to the plurality pieces of second pose information to generate a three dimensional image of the object. The display is used to display the three dimensional image of the object.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
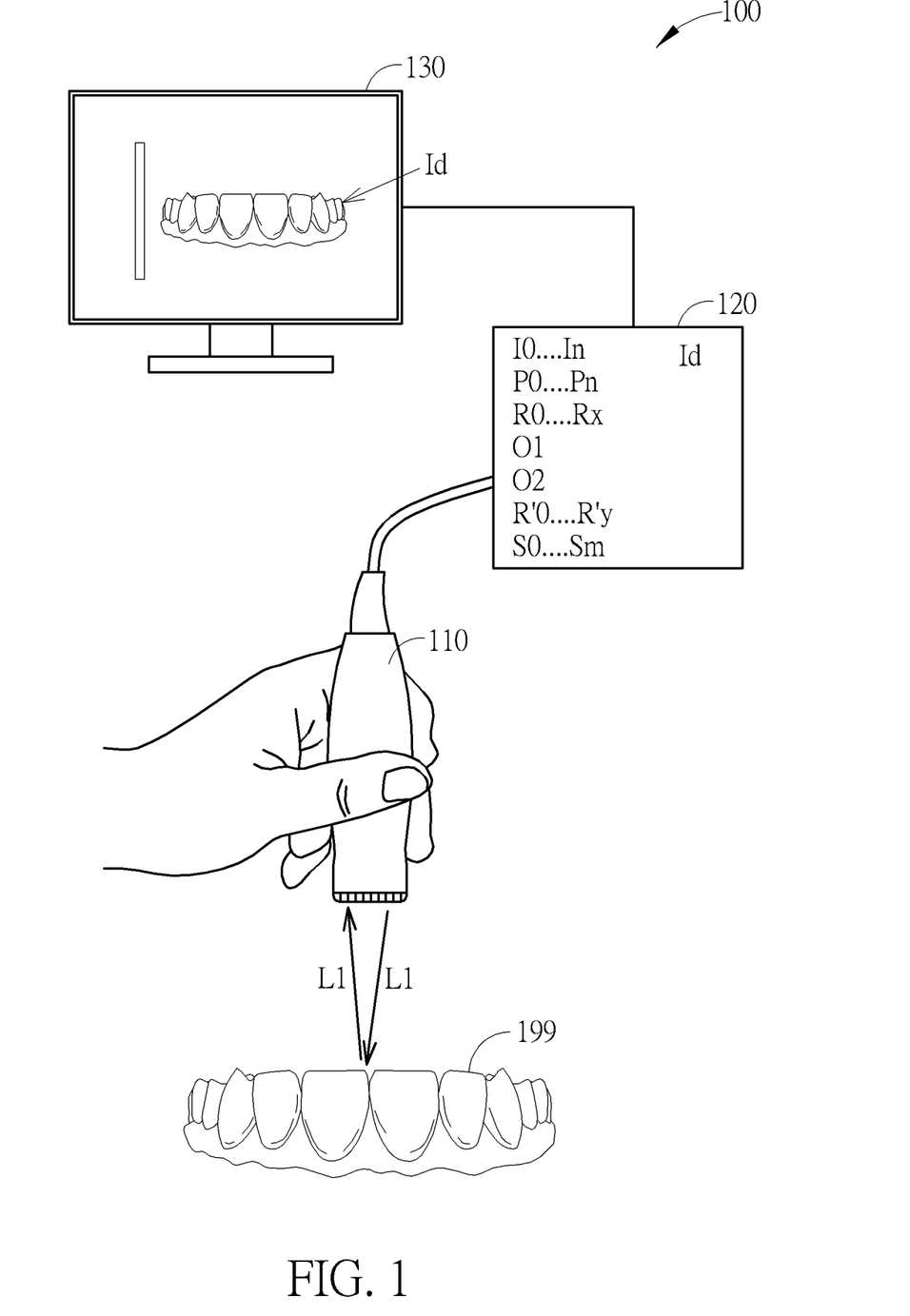
FIG. 1 illustrates a three dimensional image generation system according to an embodiment.
Figure 2:
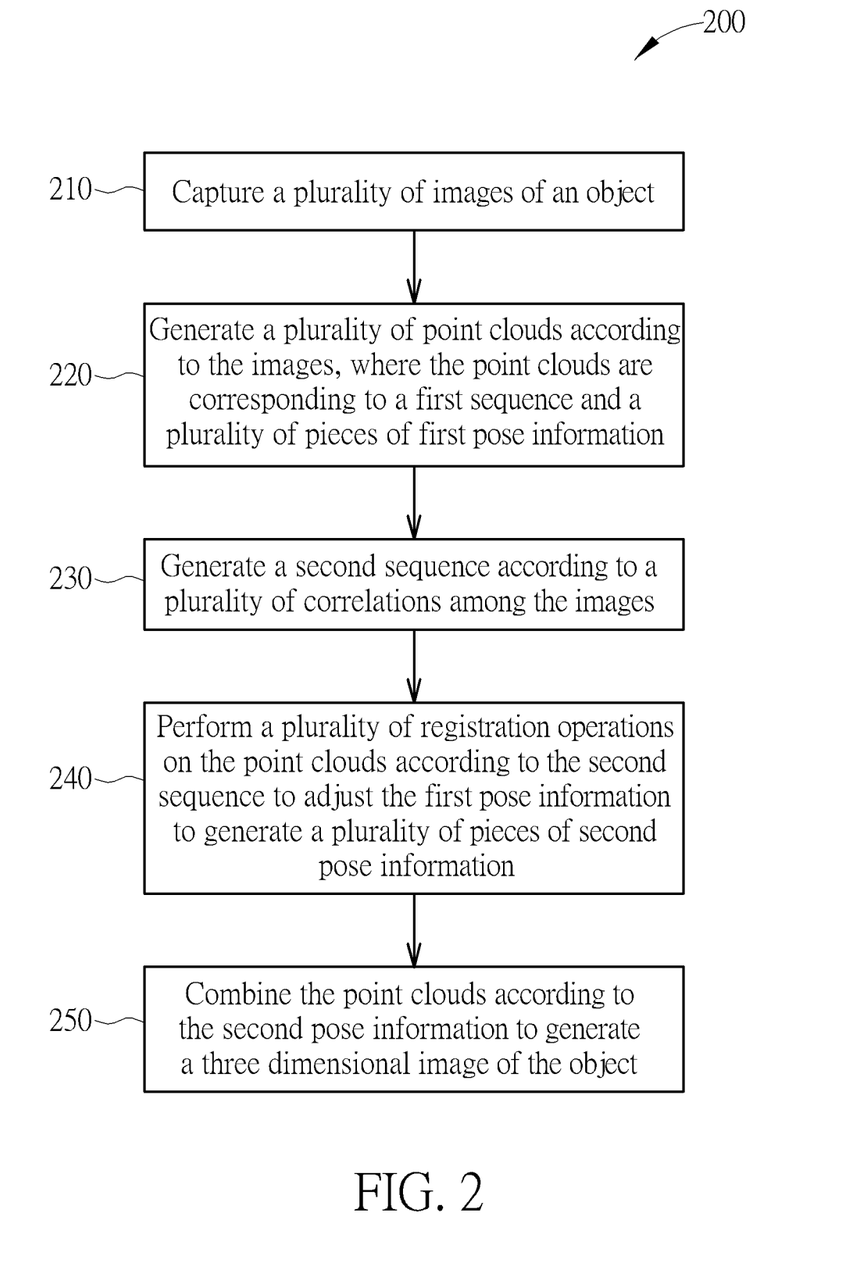
FIG. 2 illustrates a three dimensional image generation method performed with the system in FIG. 1.

For improving the quality of the generated three dimensional (3D) image, embodiments can provide solutions as below. FIG. 1 illustrates a three dimensional image generation system 100 according to an embodiment. The three dimensional image generation system 100 can include a detector 110, a processor 120 and a display 130. FIG. 2 illustrates a three dimensional image generation method 200 performed with the three dimensional image generation system 100 in FIG. 1. As mentioned in FIG. 2, the following steps can be performed.

Step 210: capture a plurality of images I0 to In of an object 199;

Step 220: generate a plurality of point clouds P0 to Pn according to the images I0 to In, where the point clouds P0 to Pn are corresponding to a first sequence O1 and a plurality of pieces of first pose information R0 to Rx;

Step 230: generate a second sequence O2 according to a plurality of correlations S0 to Sm among the images I0 to In;

Step 240: perform a plurality of registration operations on the point clouds P0 to Pn according to the second sequence O2 to adjust the first pose information R0 to Rx to generate a plurality of pieces of second pose information R'0 to R'y; and Step 250: combine the point clouds P0 to Pn according to the second pose information R'0 to R'y to generate a three dimensional image Id of the object 199.

The abovementioned m, n, x and y can be integers larger than zero. The detector 110 can emit the light L1 and receive the reflected light L1 for performing Step 210. The processor 120 can be used for performing Steps 220 to 250. The display 130 can display the three dimensional image Id generated in Step 250.

In Step 220, the first pose information R0 to Rx can include a plurality of first pose matrices. In Step 240, the second pose information R'0 to R'y can include a plurality of second pose matrices. Each pose matrix can include parameters used to process and transform a point cloud.

In Step 230, a plurality of ranges can be generated according to distributions of the point clouds P0 to Pn. A plurality of center points of the ranges can be generated, and the center points can be connected using a minimum spanning tree algorithm to generate the second sequence O2. For example, a Kruskal algorithm, a Prim algorithm or other proper algorithms can be used to generate the second sequence O2.

In Step 240, the plurality of registration operations can include a plurality of pose-graph operations used to perform nonlinear optimization operations for generating the global optimal pose parameters of each point cloud.

FIG. 3 to FIG. 7 illustrate a process of generating the three dimensional image Id through the three dimensional image generation system 100 and the three dimensional image generation method 200. FIG. 3 to FIG. 7 illustrate an example for explanation, and embodiments are not limited thereto.

Figure 3:
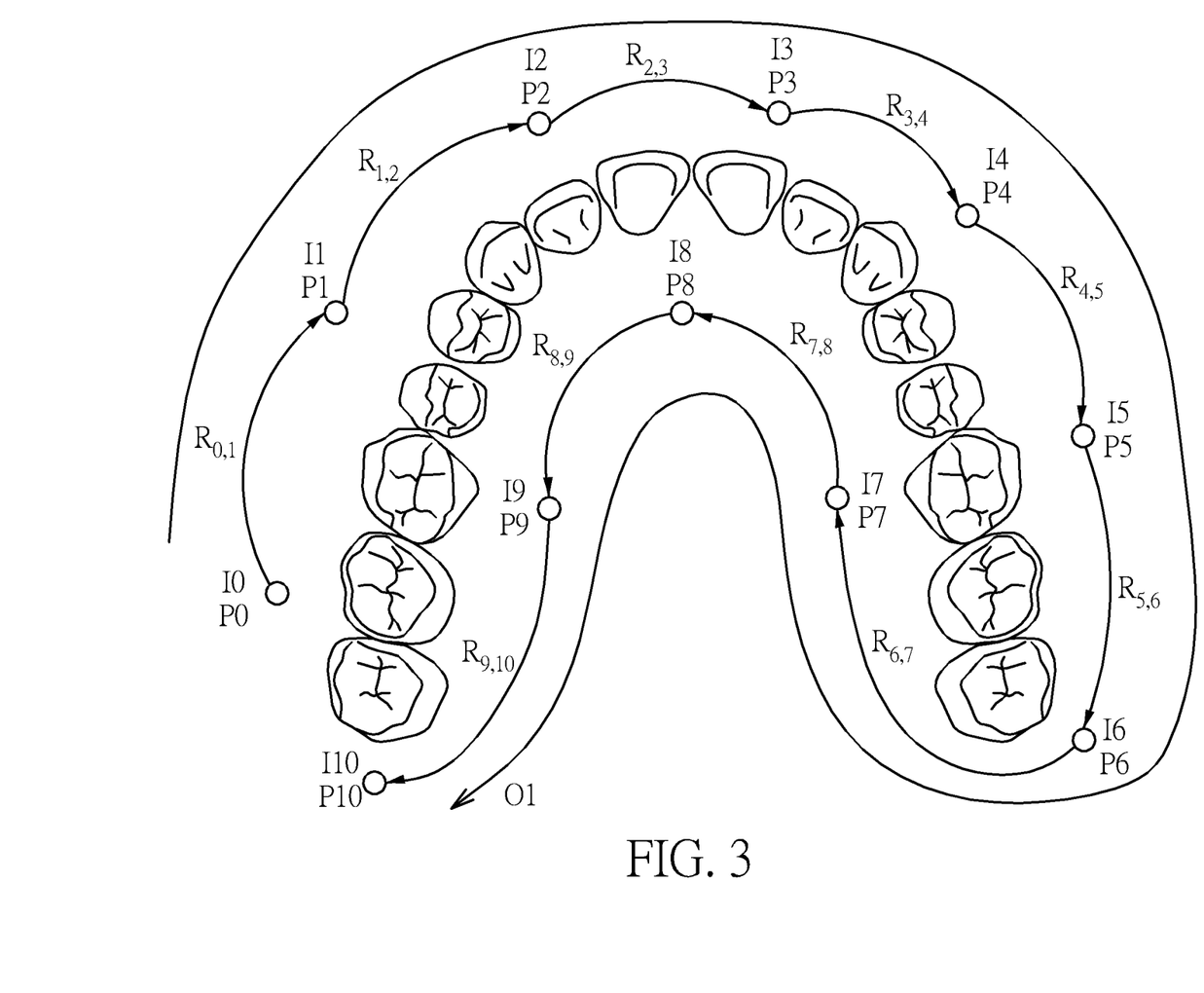
FIG. 3 to FIG. 7 illustrate a process of generating the three dimensional image through the three dimensional image generation system in FIG. 1 and the three dimensional image generation method in FIG. 2.

In FIG. 3, after scanning the object 199 (e.g. teeth) in Step 210, the images I0 to I10 of the object 199 can be captured. In Step 220, the images I0 to I10 can be used to generate the point clouds P0 to P10 respectively. A plurality of registration operations can be performed with the point clouds P0 to P10 according to the first sequence O1 to generate a plurality of pieces of first pose information $R_{0,1}$ to $R_{9,10}$. The first sequence O1 can be corresponding to the point clouds P0, P1, P2, P3, P4, P5, P6, P7, P8, P9 and P10 in sequence.

The first pose information $R_{0,1}$ can be generated by performing a registration operation using the point clouds P0 and P1. The first pose information $R_{1,2}$ can be generated by performing a registration operation using the point clouds P1 and P2. The first pose information $R_{2,3}$ can be generated by performing a registration operation using the point clouds P2 and P3. The first pose information $R_{3,4}$ can be generated by performing a registration operation using the point clouds P3 and P4. The first pose information $R_{4,5}$ can be generated by performing a registration operation using the point clouds P4 and I35, and so on. The first pose information $R_{9,10}$ can be generated by performing a registration operation using the point clouds P9 and P10.

Figure 4:
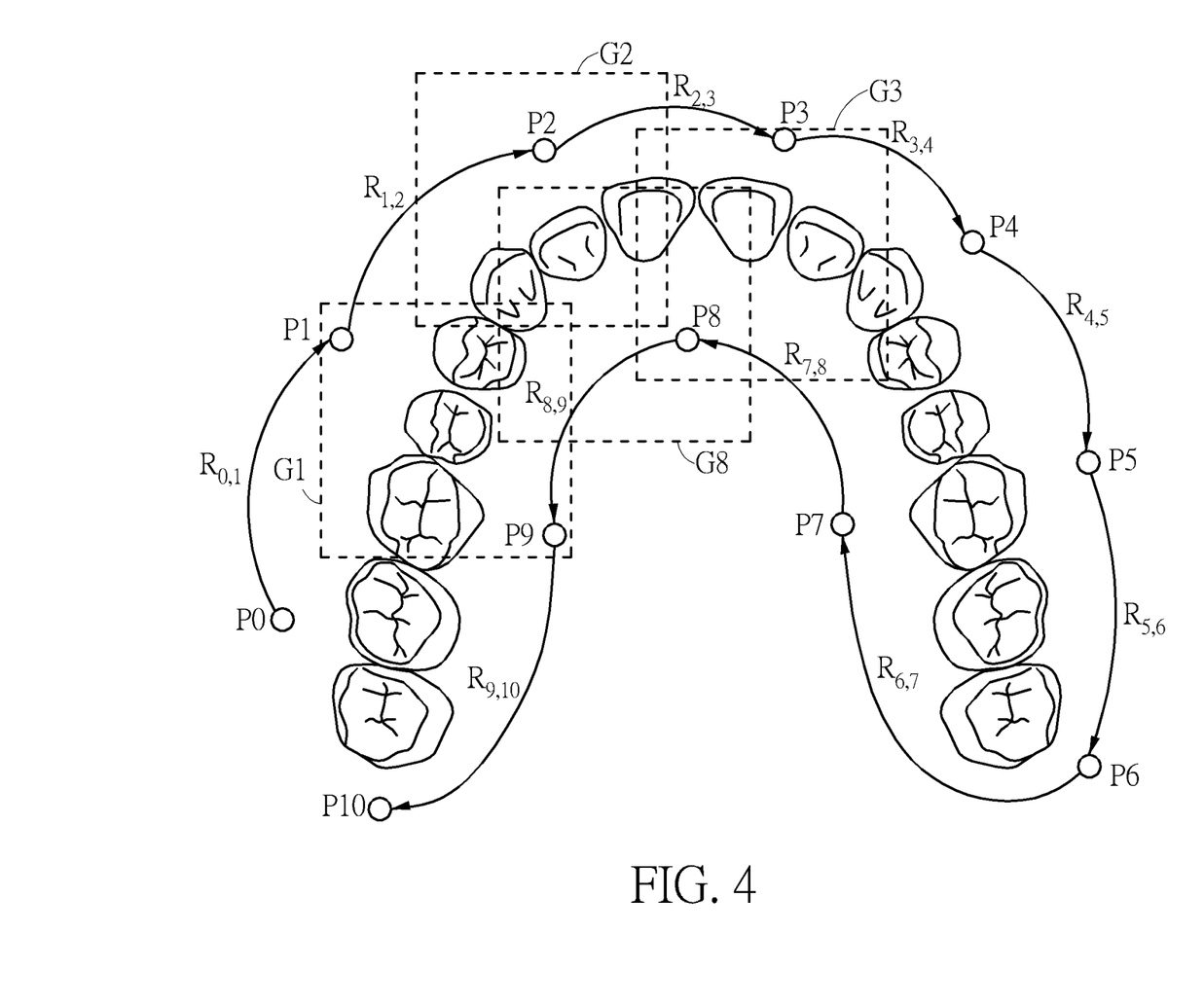

In FIG. 4, ranges G1, G2, G3 and G8 can be generated according to the points P1, P2, P3 and P8 respectively, and the correlations among the point clouds can be generated accordingly. More details will be described below in FIG. 8 and FIG. 9.

Figure 5:
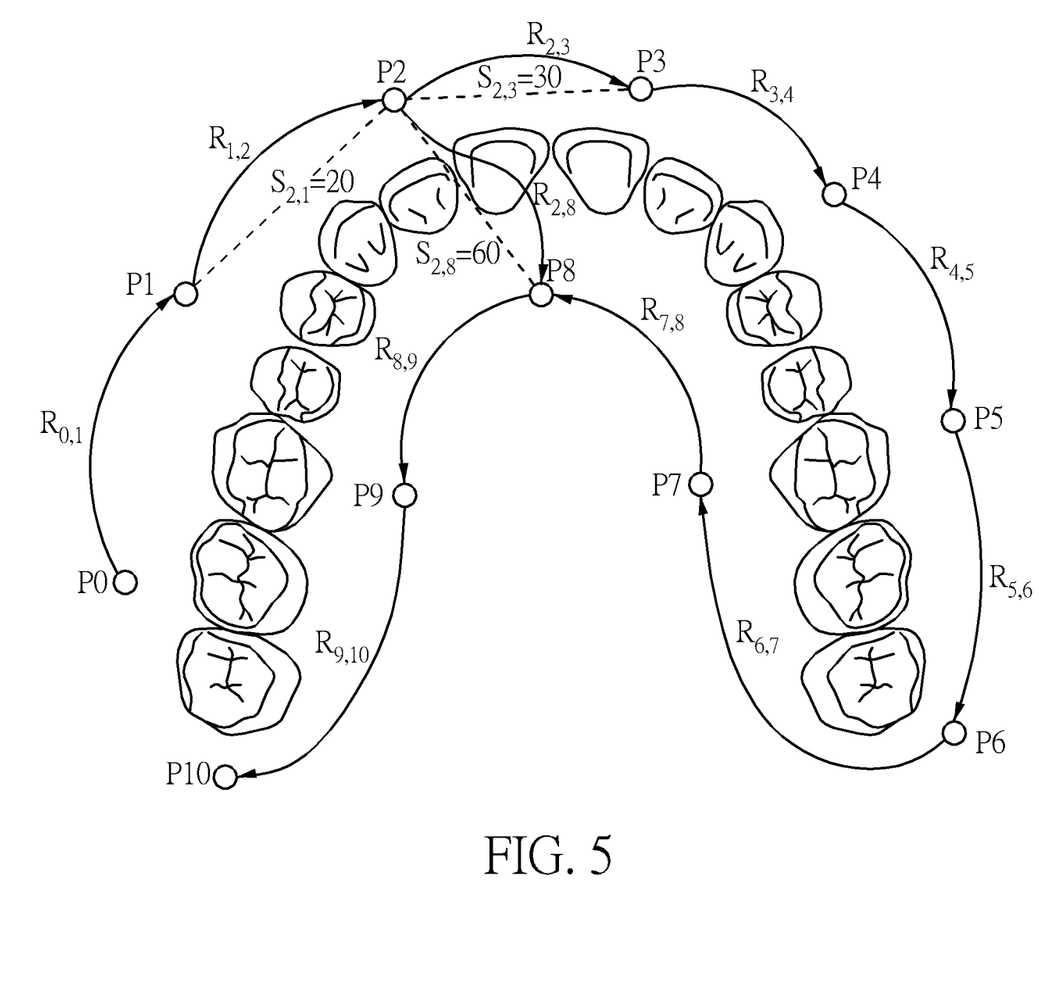
Figure 6:
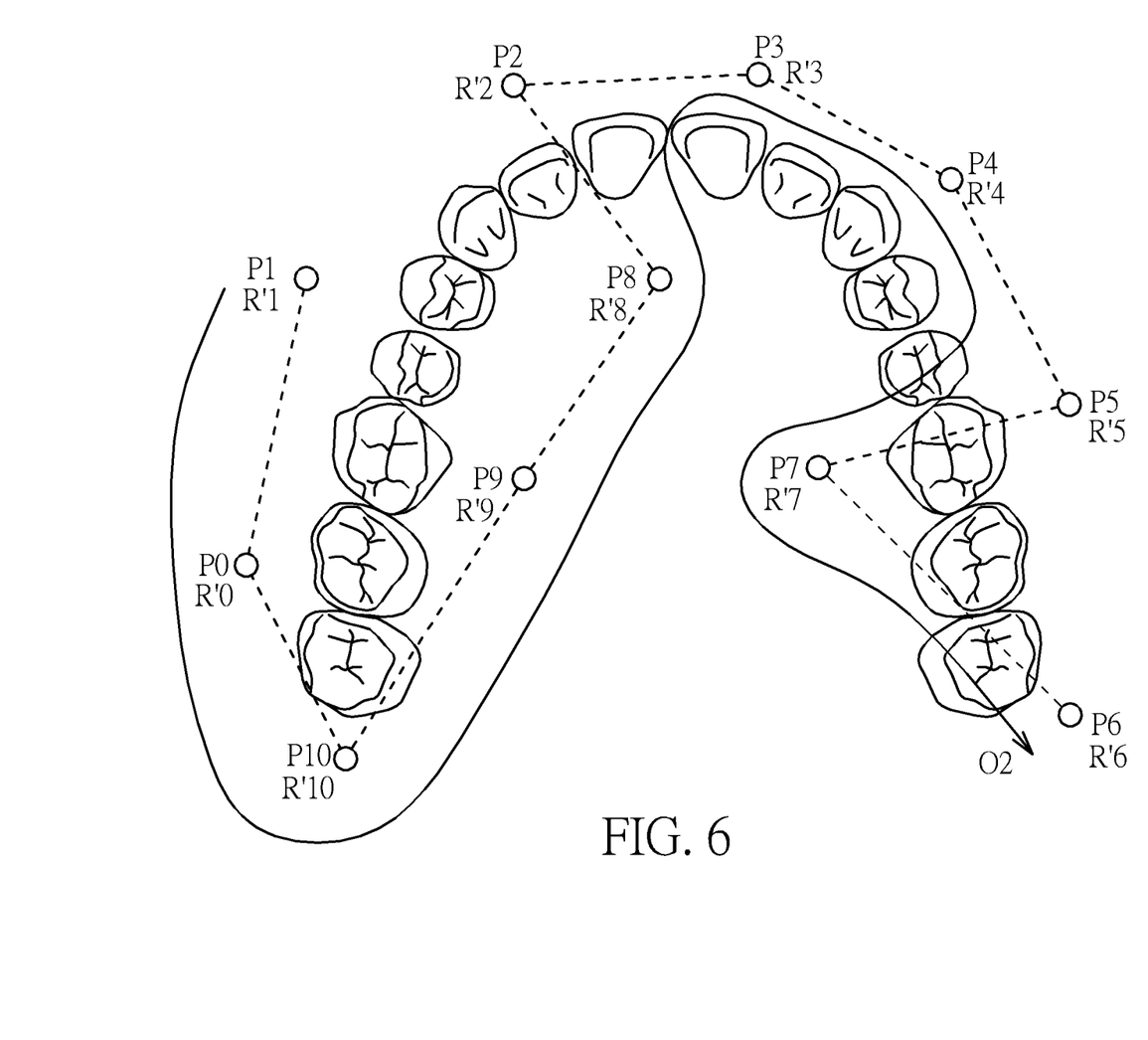

As shown in FIG. 4 to FIG. 6, in Step 230, the correlation of each pair of the point clouds P0 to P10 can be calculated to generate a plurality of correlations. For example, in FIG. 5, the correlation $S_{2,1}$ can be the correlation between the point clouds P2 and P1. The correlation $S_{2,8}$ can be the correlation between the point clouds P2 and P8. The correlation $S_{2,3}$ can be the correlation between the point clouds P2 and P3, and so on. According to the correlations among the point clouds P0 to P10, the point clouds P0 to P10 can be reordered to generate the second sequence O2.

In the example of FIG. 4 to FIG. 6, if the correlation $S_{2,8}$ (e.g. 60 units) is greater than the correlation $S_{2,3}$ (e.g. 30 units), and the correlation $S_{2,3}$ (e.g. 30 units) is greater than the correlation $S_{2,1}$ (e.g. 20 units), the first sequence O1 can be adjusted accordingly. When reordering the point clouds P0 to P10, the point cloud P2 can be adjacent to the point cloud P8 instead of the point cloud P1 in the second sequence O2 since the correlation $S_{2,8}$ is greater than the correlation $S_{2,1}$. Likewise, the point clouds P0 to P10 can be reordered to generate the second sequence O2 in FIG. 6. The second sequence O2 can be corresponding to the point clouds P1, P0, P10, P9, P8, P2, P3, P4, P5, P7 and P6 in sequence.

Figure 7:
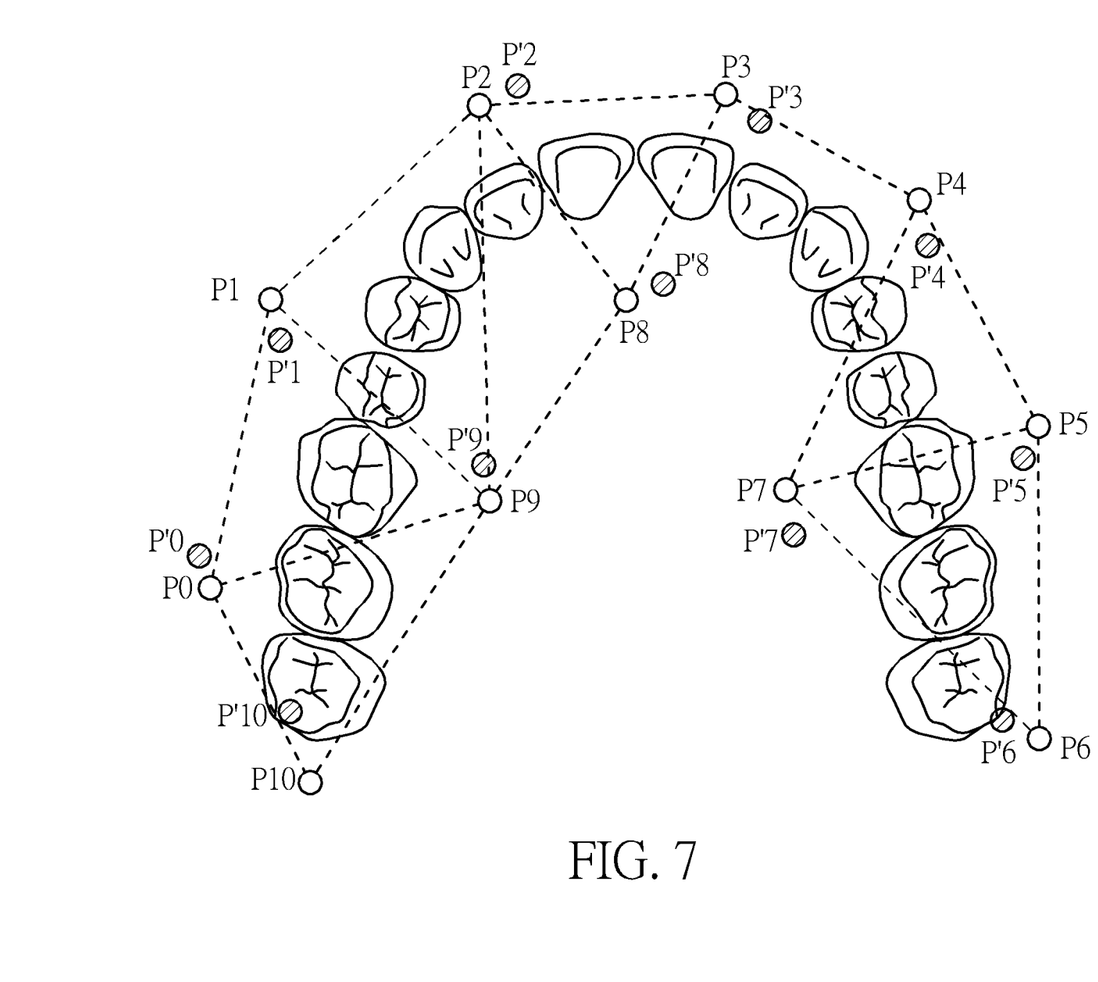

As shown in FIG. 6 and FIG. 7, in Step 240, a plurality of registration operations (e.g. pose-graph operations) can be performed on the point clouds P1, P0, P10, P9, P8, P2, P3, P4, P5, P7 and P6 in the second sequence O2 to generate the second pose information R'1, R'0, R'10, R'9, R'8, R'2, R'3, R'4, R'5, R'7 and R'6. In Step 250, the second pose information R'0 to R'10 can be used to adjust the point clouds P0 to P10 to generate adjusted point clouds P'0 to P'10, and the adjusted point clouds P'0 to P'10 can be combined to generate the three dimensional image Id of the object 199. In FIG. 7, the adjusted point clouds P'0 to P'10 can be combined with a point cloud fusion process and a mesh process to generate a three dimensional mesh model with improved accuracy.

In FIG. 3 to FIG. 7, unlike the first sequence O1, the second sequence O2 is generated with considering the correlations among the point clouds P0 to P10. Hence, by adjusting and combining the point clouds P0 to P10 according to the second sequence O2, the errors caused by moving the scanner 110 too fast or too slow and other factors when scanning the object 199 can be reduced. As a result, the quality of the three dimensional image Id is improved.

Figure 8:
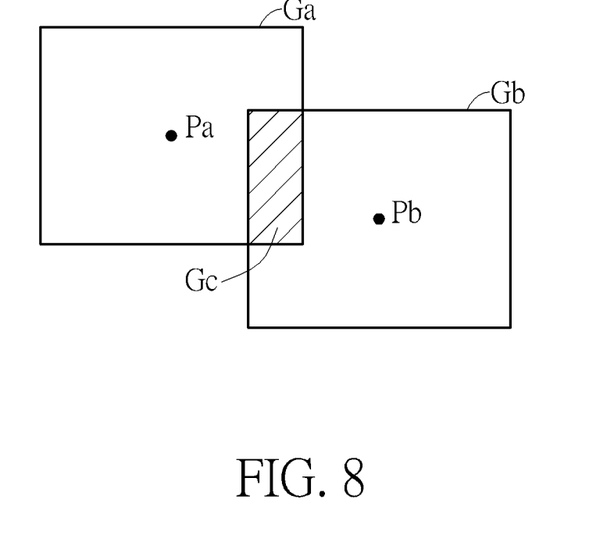
FIG. 8 is a diagram about calculating a correlation between two point clouds in FIG. 2.

FIG. 8 shows a diagram about calculating a correlation between two point clouds in Step 230 of FIG. 2. FIG. 8 is an example, and embodiments are not limited thereto. A first range Ga can be generated according to the distribution of a first point cloud Pa. A second range Gb can be generated according to the distribution of a second point cloud Pb. A correlation between the first point cloud Pa and the second point cloud Pb can be determined according to an overlapping portion Gc of the first range Ga and the second range Gb. The first range Ga and the second range Gb can be generated according to bonding boxes of the first point cloud Pa and the second point cloud Pb.

If the overlapping portion Gc is between a first threshold and a second threshold greater than the first threshold, the correlation between the first point cloud Pa and the second point cloud Pb can increase with the overlapping portion Gc.

In another scenario, if the overlapping portion Gc is greater than a threshold, it can be determined the correlation between the first point cloud Pa and the second point cloud Pb is so high that the influence of the two point clouds on the three dimensional image Id is substantially the same. Hence, only one of the first point cloud Pa and the second point cloud Pb can be applied if the overlapping portion Gc is greater than the threshold.

In another scenario, if the overlapping portion is smaller than a threshold, the correlation between the first point cloud Pa and the second point cloud Pb is determined to be a minimum, such as zero units or a minimum preset in the system. For example, if the correlation between the first point cloud Pa and the second point cloud Pb is the minimum, the first point cloud Pa and the second point cloud Pb cannot be adjacent to one another in the second sequence O2 mentioned in FIG. 2.

In another embodiment, in Step 230 of FIG. 2, when calculating a correlation between two point clouds, a match operation can be performed using the two point clouds to generate the correlation. For example, the match operation can include an iterative closest point (ICP) operation.

Figure 9:
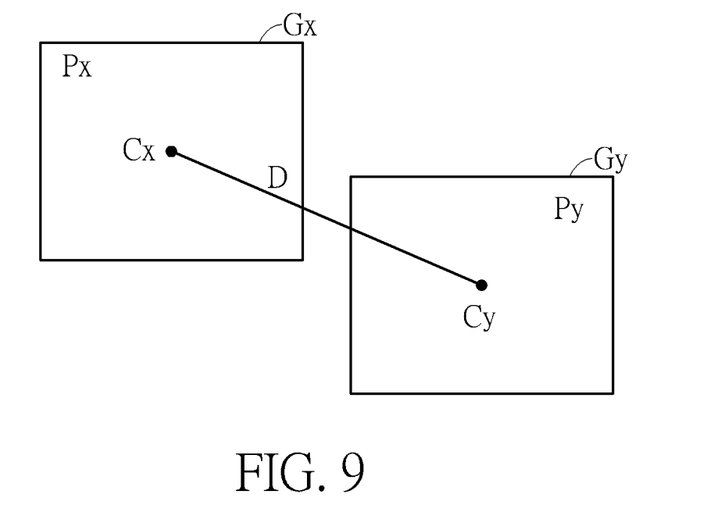
FIG. 9 is a diagram about calculating a correlation between two point clouds in FIG. 2 according to another embodiment.

FIG. 9 shows a diagram about calculating a correlation between two point clouds in Step 230 of FIG. 2 according to another embodiment. FIG. 9 is an example, and embodiments are not limited thereto. A first range Gx can be generated according to the distribution of a first point cloud Px, and a first center point Cx of the first range Gx can be generated. A second range Gy can be generated according to the distribution of a second point cloud Py, and a second center point Cy of the second range Gy can be generated. The correlation between the first point cloud Px and the second point cloud Py can be determined according to a distance D between the first center point Cx and the second center point Cy.

If the distance D is between a first threshold and a second threshold greater than the first threshold, the correlation between the first point cloud Px and the second point cloud Py can be higher if the distance D is smaller.

In another scenario, if the distance D is smaller than a threshold, it can be determined the correlation between the first point cloud Px and the second point cloud Py is so high that the impact of the two point clouds on the three dimensional image Id is substantially the same. Hence, only one of the first point cloud Px and the second point cloud Py is applied if the distance D is smaller than the threshold.

In another scenario, if the distance D is greater than a threshold, the correlation between the first point cloud Px and the second point cloud Py can be determined to be a minimum, such as zero units or a minimum preset in the system. For example, if the correlation between the first point cloud Px and the second point cloud Py is minimum, the first point cloud Px and the second point cloud Py cannot be adjacent to one another in the second sequence O2 mentioned in FIG. 2.

In summary, through the three dimensional image generation system 100 and the three dimensional image generation method 200, the detector 110 can be moved to scan the object 199 to capture images. A plurality of point clouds can be generated according to the images. Pose information can be calculated for combining the point clouds into a three dimensional model of the object 199. The point clouds, sequential numbers of the point clouds and the pose information can be stored, and the generated three dimensional image can be displayed on the display 130 in real time. In the stored data, each point cloud can be accessed, and the sequence and overlaps among the point clouds can be considered to calculate the correlations among the point clouds. The point clouds can be reordered according to the correlations among the point clouds. The correlations can be calculated according to similarity or overlap of two point clouds on a two dimensional plane or in a three dimensional space. According to the correlations among the point clouds, an improved sequence (e.g. the second sequence O2) can be generated, and registration operations can be performed according to the improved sequence to generate improved pose parameters. The improved sequence and the improved pose parameters can be used to combine the point clouds in sequence to establish an improved three dimensional model. Nonlinear optimization operations (e.g. pose graph operations) can be used according to an improved path and an updated sequence (e.g. the second sequence O2) to generate the global optimal pose parameters of each point clouds. The global optimal pose parameters can be used to adjust the point clouds (e.g. generation of the point clouds P'0 to P' 10 in FIG. 7) for combining and fusing the adjusted point clouds to form the three dimensional image. With a point cloud fusion process and a mesh process, a three dimensional mesh model and a three dimensional image of the object 199 with higher accuracy and correctness are formed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A three dimensional image generation method, comprising:
   capturing a plurality of images of an object;
   generating a plurality of point clouds corresponding to a first sequence of the plurality of point clouds and a plurality of pieces of first pose information according to the plurality of images;
   calculating a correlation between each pair of point clouds of the plurality of point clouds to generate a plurality of correlations;
   reordering the plurality of point clouds according to the plurality of correlations to generate a second sequence of the plurality of point clouds;
   performing a plurality of registration operations on the plurality of point clouds in the second sequence of the plurality of point clouds to adjust the plurality of pieces of first pose information to generate a plurality of pieces of second pose information; and
   combining the plurality of point clouds according to the plurality of pieces of second pose information to generate a three dimensional image of the object;
   wherein calculating the correlation between the each pair of point clouds of the plurality of point clouds, comprises:
      generating a first range according to a distribution of a first point cloud of the each pair of point clouds;
      generating a second range according to a distribution of a second point cloud of the each pair of point clouds; and
      determining the correlation between the each pair of point clouds according to an overlapping portion of the first range and the second range;
   wherein if the overlapping portion between a first threshold and a second threshold is greater than the first threshold, the correlation between the each pair of point clouds increases with the overlapping portion.

2. The method of claim 1, wherein only one of the first point cloud and the second point cloud is applied if the overlapping portion is greater than a third threshold.

3. The method of claim 1, wherein the correlation between the each pair of point clouds is determined to be a minimum if the overlapping portion is smaller than a fourth threshold.

4. The method of claim 1, wherein calculating the correlation between the each pair of point clouds of the plurality of point clouds, further comprises:
   performing a match operation using the first point cloud and the second point cloud of the each pair of point clouds to determine the correlation between the each pair of point clouds.

5. The method of claim 4, wherein the match operation comprises an iterative closest point (ICP) operation.

6. The method of claim 1, wherein the plurality of pieces of first pose information comprises a plurality of first pose matrices, and the plurality of pieces of second pose information comprises a plurality of second pose matrices.

7. The method of claim 1, wherein the plurality of registration operations comprises a plurality of pose-graph operations.

8. A three dimensional image generation method, comprising:
   capturing a plurality of images of an object;

generating a plurality of point clouds corresponding to a first sequence of the plurality of point clouds and a plurality of pieces of first pose information according to the plurality of images;

calculating a correlation between each pair of point clouds of the plurality of point clouds to generate a plurality of correlations;

reordering the plurality of point clouds according to the plurality of correlations to generate a second sequence of the plurality of point clouds;

performing a plurality of registration operations on the plurality of point clouds in the second sequence of the plurality of point clouds to adjust the plurality of pieces of first pose information to generate a plurality of pieces of second pose information; and combining the plurality of point clouds according to the plurality of pieces of second pose information to generate a three dimensional image of the object;

wherein calculating the correlation between the each pair of point clouds of the plurality of point clouds, comprises:

generating a first range according to a distribution of a first point cloud of the each pair of point clouds;

generating a first center point of the first range;

generating a second range according to a distribution of a second point cloud of the each pair of point clouds;

generating a second center point of the second range; and determining the correlation between the each pair of point clouds according to a distance between the first center point and the second center point.

9. The method of claim 8, wherein if the distance is between a first threshold and a second threshold greater than the first threshold, the correlation between the each pair of point clouds is higher if the distance is smaller.

10. The method of claim 8, wherein only one of the first point cloud and the second point cloud is applied if the distance is smaller than a threshold.

11. The method of claim 8, wherein the correlation between the each pair of point clouds is determined to be a minimum if the distance is greater than a threshold.

12. A three dimensional image generation method, comprising:

capturing a plurality of images of an object;

generating a plurality of point clouds corresponding to a first sequence of the plurality of point clouds and a plurality of pieces of first pose information according to the plurality of images;

generating a plurality of ranges according to distributions of the plurality of point clouds;

generating a plurality of center points of the plurality of ranges;

connecting the plurality of center points with a minimum spanning tree algorithm to generate a second sequence of the plurality of point clouds;

performing a plurality of registration operations on the plurality of point clouds in the second sequence of the plurality of point clouds to adjust the plurality of pieces of first pose information to generate a plurality of pieces of second pose information; and combining the plurality of point clouds according to the plurality of pieces of second pose information to generate a three dimensional image of the object.

\* \* \* \* \*